United States Patent
Molina et al.

(10) Patent No.: US 8,272,002 B2
(45) Date of Patent: Sep. 18, 2012

(54) METHOD AND SYSTEM FOR IMPLEMENTING AN EXTERNAL TRUSTED PLATFORM MODULE

(75) Inventors: Jesus Molina, Washington, DC (US); Jonathan R. Agre, Brinklow, MD (US)

(73) Assignee: Fujitsu Limited, Kawasaki (JP)

( * ) Notice: Subject to any disclaimer, the term of this patent is extended or adjusted under 35 U.S.C. 154(b) by 1203 days.

(21) Appl. No.: 11/840,810

(22) Filed: Aug. 17, 2007

(65) Prior Publication Data

US 2008/0046898 A1 Feb. 21, 2008

Related U.S. Application Data

(60) Provisional application No. 60/822,864, filed on Aug. 18, 2006.

(51) Int. Cl.
*G06F 9/44* (2006.01)
*G06F 11/30* (2006.01)
*H04L 29/06* (2006.01)

(52) U.S. Cl. ......... 719/330; 713/151; 713/189; 713/190

(58) Field of Classification Search ................... 719/310, 719/330; 713/151, 160, 162, 189, 190
See application file for complete search history.

(56) References Cited

U.S. PATENT DOCUMENTS

| | | | |
|---|---|---|---|
| 7,028,149 B2* | 4/2006 | Grawrock et al. | 711/156 |
| 7,222,062 B2 | 5/2007 | Goud et al. | |
| 7,552,326 B2 | 6/2009 | Liu et al. | |
| 7,552,419 B2* | 6/2009 | Zimmer et al. | 717/121 |
| 7,603,707 B2* | 10/2009 | Seifert et al. | 726/22 |
| 7,849,312 B2* | 12/2010 | Maletsky et al. | 713/168 |
| 2003/0074548 A1 | 4/2003 | Cromer et al. | |
| 2003/0188113 A1* | 10/2003 | Grawrock et al. | 711/156 |
| 2003/0229802 A1 | 12/2003 | Challener et al. | |
| 2005/0210467 A1* | 9/2005 | Zimmer et al. | 718/1 |
| 2005/0213768 A1 | 9/2005 | Durham et al. | |
| 2005/0216736 A1 | 9/2005 | Smith | |
| 2005/0283826 A1* | 12/2005 | Tahan | 726/2 |
| 2006/0053277 A1* | 3/2006 | Wang et al. | 713/2 |
| 2006/0075223 A1 | 4/2006 | Bade et al. | |
| 2006/0085844 A1* | 4/2006 | Buer et al. | 726/4 |
| 2006/0107032 A1* | 5/2006 | Paaske et al. | 713/2 |
| 2006/0136717 A1* | 6/2006 | Buer et al. | 713/155 |
| 2006/0212939 A1 | 9/2006 | England et al. | 726/22 |
| 2006/0236092 A1 | 10/2006 | Hamalainen | |
| 2006/0256106 A1 | 11/2006 | Scarlata et al. | |
| 2007/0006169 A1 | 1/2007 | Iliev et al. | |
| 2007/0016766 A1 | 1/2007 | Richmond et al. | |

(Continued)

OTHER PUBLICATIONS

Ahmad-Reza et al., "Design and Implementation of a Secure Linux Device Encryption Architecture," pp. 1-10, Linus Tag, 2006.

(Continued)

*Primary Examiner* — Van Nguyen
(74) *Attorney, Agent, or Firm* — Baker Botts L.L.P.

(57) ABSTRACT

A method for implementing an external trusted platform module includes establishing a connection with a remote host device via a remote interface. The method also includes receiving and processing a request for a trusted platform module (TPM) function from the remote host device via the remote interface. The method additionally includes generating a response to the request for the TPM function based on the processing of the request for the TPM function received from the remote host device. The method further includes sending the response to the request for the TPM function to the remote host device via the remote interface.

35 Claims, 3 Drawing Sheets

U.S. PATENT DOCUMENTS

| | | | |
|---|---|---|---|
| 2007/0042754 | A1 | 2/2007 | Bajikar et al. |
| 2007/0174600 | A1* | 7/2007 | Williams et al. .................. 713/1 |
| 2007/0192580 | A1* | 8/2007 | Challener et al. ................. 713/2 |
| 2007/0204153 | A1 | 8/2007 | Tome et al. |
| 2007/0223519 | A1* | 9/2007 | Wang et al. ................... 370/463 |
| 2007/0226496 | A1 | 9/2007 | Maletsky et al. |
| 2007/0300069 | A1 | 12/2007 | Rozas |
| 2008/0046581 | A1 | 2/2008 | Molina et al. |
| 2008/0046752 | A1 | 2/2008 | Berger et al. |
| 2008/0046898 | A1 | 2/2008 | Molina et al. |

OTHER PUBLICATIONS

Nicolai Kuntze et al., "Trusted Computing in Mobile Action," pp. 1-12, Proceedings of the Information Security South Africa (ISSA) Conference, 2006.

TCG Best Practices Committee, "Trusted Computing Group Information," Version 2.0, pp. 1-13, Trusted Computing Group, 2005.

Molina et al., U.S. Appl. No. 11/840,823, Office Action from US Patent and Trademark Office dated Dec. 22, 2010.

Rau, "The Trusted Computing Platform Emerges as Industry's First Comprehensive Approach to IT Security," IDC Executive Brief, © 2006 IDC, https://www.trustedcomputinggroup.org/news/Industry_Data/IDC_448_Web.pdf.

Oltsik, "Trusted Enterprise Security," White paper, The Enterprise Strategy Group, Jan. 2006. https://www.trustedcomputinggroup.org/news/Industry_Data/ESG_White_Paper.pdf.

"Trusted Platform Module FAQ," Trusted Computing Group: TPM FAQ, https://www.trustedcomputinggroup.org/faq/TMPFAQ/, Jul. 31, 2006.

Molina et al., U.S. Appl. No. 11/840,823, Final Office Action from the U.S. Patent and Trademark Office dated May 25, 2011.

Molina et al., U.S. Appl. No. 11/840,823, Response filed Jul. 25, 2011 to Final Office Action from the U.S. Patent and Trademark Office dated May 25, 2011.

Molina et al., U.S. Appl. No. 11/840,823, "Method and System for Implementing a Mobile Trusted Platform Module," Office Action from US Patent and Trademark Office dated May 25, 2011.

Maheshwari, et al., "How to Build a Trusted Database System on Untrusted Storage," http://www.usenix.org/events/osdi2000/full_papers/maheshwari/maheshwari.pdf.

Kay, How to Implement Trusted Computing, A Guide to Tighter Enterprise Security, Endpoint Technologies Associates. https://www.trustedcomputinggroup.org/news/Industry_Data/Implementing_Trusted_Computing_RK.pdf.

Office Action Summary issued by the USPTO for U.S. Appl. No. 11/840,823 dated Jun. 27, 2012; Filing Date: Aug. 17, 2007.

"vTPM: Virtualizing the Trusted Platform Module" by Stevan Berger et al.; RC23879 (WS0602-126).

* cited by examiner

METHOD AND SYSTEM FOR IMPLEMENTING AN EXTERNAL TRUSTED PLATFORM MODULE

CROSS-REFERENCE TO RELATED APPLICATIONS

This application claims benefit under 35 U.S.C. §119(e) to U.S. Provisional Application Ser. No. 60/822,864 filed Aug. 18, 2006 by Molina, et al., and entitled Method and System for Implementing an External Trusted Platform Module, which is hereby incorporated by reference.

TECHNICAL FIELD OF THE INVENTION

This invention relates generally to computer security and, more particularly, to a method and system for implementing an external trusted platform module.

BACKGROUND

The Trusted Platform Module (TPM) chip, as defined by the Trusted Computing Group standard, is a hardware device typically installed as part of a computing device such as a laptop or desktop PC (and potentially in devices such as cell phones and PDAs). Current implementations of the TPM architecture assume a physical binding between the TPM chip and a single hardware platform. The TPM chip is typically installed as part of a system (e.g. a chip on the PCI bus) and is used to provide trusted information on the identity and internal state of the device in order to validate the current hardware and software and store cryptographic secrets and identities. The TPM chip facilitates verification of the integrity of the software and hardware by supporting measurement functions. This is expected to increase the ability to defend against viruses and other security attacks and to verify that the installed software has not been modified. The TPM chip in personal computers (laptops, desktop PCs) is already on the market and its use is increasing rapidly. Moreover, security systems utilizing TPM functionality are beginning to be deployed for applications which require enhanced levels of data security, such as medical record handling. The most common implementation of a TPM is a chip physically attached to the motherboard of a computer. The TPM functionality is accessed by software using a well defined command set and application programming interface (API). Through this command set, the TPM chip provides cryptographic functionality such as encrypting, signing, key generation and random number generation. The TPM chip can also store a limited amount of information, such as keys in a non-volatile, protected memory space.

Additionally, the TPM chip contains a set of extensible Platform Configuration Registers (PCRs). PCRs are used to store measurements on the current status of the platform and its software. PCRs are reset to their present values when the system powers up and/or when the system powers off and can only be extended, but never directly modified. Any changes made (after initialization) to the PCRs are made in separate areas and are cryptographically protected. A sequence of measurements on the system hardware configuration and software is performed to build up a chain of trusted components and modules. For example, the boot loader, the BIOS, the Operating System and the applications can be measured as part of this chain of trust. The measurements to be stored in the PCRs are performed by each module (parent) before handing off control to the successor components (children). The first measuring entity of the platform is trusted by default, as it is not previously measured by any other entities. This early measuring entity is called the Core Root of Trust (CRT) for measurement. For security, the CRT may be stored inside the TPM chip itself. After the first measurement by the CRT all software entities launched are expected to continue the chain of trust by extending the PCR registers before launching any other software. Each measurement is recorded and can be cryptographically verified using the PCRs by a verification party. The action of sending these measurements to a verification party for verification is called attestation.

The Trusted Computing Group (TCG) has defined open standards for hardware-based system security. The specifications provided by the TCG center around the TPM chip and its functionality. More specifically, the TCG bases its standards on the TPM chip as the hardware root-of-trust. In addition, the TCG has defined standards for a Trusted Software Stack (TSS) that defines an application programming interface (API) to the TPM commands and that greatly facilitates development of applications that use TPM functionality. While the TCG's standard is based on a physical TPM chip, there has been some work done with software based TPM emulators. The software based TPM emulators mimic the behavior of a real TPM chip as seen from the TPM driver interface. These software-based TPM emulators are typically installed and executed in and on the device that is running an application that needs the TPM functionality provided by the software based TPM emulator.

SUMMARY OF THE DISCLOSURE

Particular embodiments provide a method and system for implementing an external trusted platform module that substantially eliminates or reduces at least some of the disadvantages and problems associated with previous methods and systems.

In accordance with a particular embodiment, a method for implementing an external trusted platform module includes establishing a connection with a remote host device via a remote interface. The method also includes receiving and processing a request for a trusted platform module (TPM) function from the remote host device via the remote interface. The method additionally includes generating a response to the request for the TPM function based on the processing of the request for the TPM function received from the remote host device. The method further includes sending the response to the request for the TPM function to the remote host device via the remote interface.

In some embodiments the method may also include receiving at least one TPM state parameter to be used when processing the request for the TPM function received from the host device via the remote interface.

In particular embodiments, the request for the TPM function received from the host device may be encrypted. Furthermore, the method may also include encrypting the response to the request for the TPM function before sending the response to the request for the TPM function to the host device via the interface.

In accordance with another embodiment, a method for implementing an external trusted platform module includes establishing a connection with an external trusted platform module (TPM) device via a remote interface. The method also includes generating a request for a TPM function. The request for the TPM function is transmitted to the external TPM device via the remote interface. The method additionally includes receiving a response to the request for the TPM function from the external TPM device via the remote interface.

In some embodiments the method may also include determining whether to route the request for the TPM function to an internal TPM microchip or to transmit the request for the TPM function to the external TPM device via the remote interface.

In accordance with another embodiment, a system for implementing an external trusted platform module includes an interface that is operable to establish a connection with a remote host device via a remote interface. The interface is further operable to receive a request for a trusted platform module (TPM) function from the remote host device via the remote interface. The system also includes a processor coupled to the interface. The processor is operable to process the request for the TPM function received from the remote host device. The processor is also operable to generate a response to the request for the TPM function based on the processing of the request for the TPM function received from the remote host device. The processor is further operable to send the response to the request for the TPM function to the remote host device via the remote interface.

In accordance with another embodiment, a system for implementing an external trusted platform module includes an interface operable to establish a connection with an external trusted platform module (TPM) device via a remote interface. The system also includes a processor coupled to the interface. The processor is operable to generate a request for a TPM function. The interface is further operable to transmit the request for the TPM function to the external TPM device via the remote interface. The interface is additionally operable to receive a response to the request for the TPM function from the external TPM device via the remote interface.

Technical advantages of particular embodiments include transmitting requests for TPM functionality to an external TPM device. Accordingly, a device such as a computer may be able to run programs that require TPM functionality without having to use a built-in TPM chip. Another technical advantage of particular embodiments includes receiving user entered TPM state parameters. Accordingly, developers may test how a product will respond to different TPM states without having to reset the external TPM each time. Yet another technical advantage includes allowing the user to keep certain personal security related information stored on the external TPM and use this in a limited number of other host machines. Accordingly, this may facilitate the ability of a mobile worker to have his personal security information available for use in several different hosts, rather than tied to a single host or only migratable to another TPM through a complex procedure as is the current practice.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of particular embodiments and their features and advantages, reference is now made to the following description, taken in conjunction with the accompanying drawings, in which.

DETAILED DESCRIPTION OF THE DRAWINGS

Figure 1:
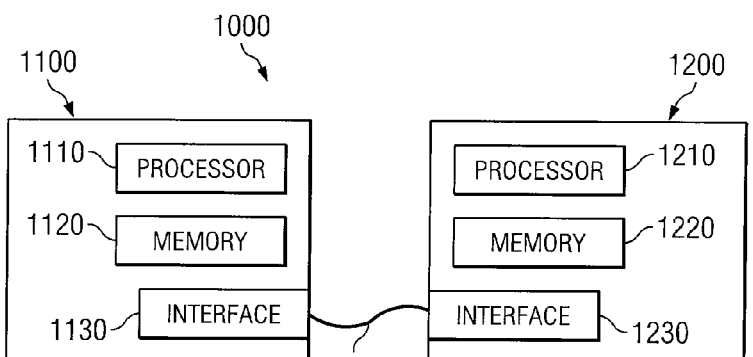
FIG. 1 is a block diagram illustrating a system implementing an external trusted platform module, in accordance with particular embodiments.

FIG. 1 is a block diagram illustrating a system implementing an external trusted platform module (ETPM), in accordance with a particular embodiment. System 1000, as depicted in FIG. 1, includes host computer 1100 and ETPM 1200. Host computer 1100 may be any type of computing device such as a desktop PC, a laptop, a personal data assistant (PDA), cell phone, or any other device capable of storing and/or processing electronic data. ETPM 1200 may also be any type of computing device capable of storing and/or processing data to implement TPM functionality. In some embodiments ETPM 1200 may be implemented using a small computing device such as a Gumstix based computer (a finger sized, full-function computer). Host computer 1100 and ETPM 1200 may be coupled via connection 1300 which may be a wireless or wireline connection. More specifically, connection 1300 may be a universal serial bus (USB) connection, an Ethernet connection, a peripheral component interconnect (PCI) connection, a memory bus connection, a serial connection, a Bluetooth connection, a radio frequency connection, or any other wired or wireless connection. By connecting ETPM 1200 to host computer 1100, host computer 1100 is able to run applications that utilize TPM functionality by communicating with ETPM 1200. In doing so, the application is able to run as though host computer 1100 comprised a built-in TPM chip.

In particular embodiments host computer 1100 may not have a built-in TPM chip. In such embodiments coupling ETPM 1200 to host computer 1100 may provide host computer 1100 with TPM functionality despite the lack of a built-in TPM chip. This may allow devices without a built-in TPM chip, such as older computing devices, to still be integrated into a secure, trusted computing environment (e.g., may allow an older device to access data or programs that require TPM functionality to operate).

In some embodiments, host computer 1100 may include a built in TPM chip. However, because of the rigid architecture inherent in a built-in TPM chip (e.g., the fact that the Platform Configuration Registers (PCRs) of a TPM chip can not be modified and can only be reset by rebooting and the fact that the chip is physically inside the device) it may be desirable to have an ETPM connected to host computer 1100. For example, a programmer may desire to connect ETPM 1200 to host computer 1100 while designing a new application that uses TPM functions even though host computer 1100 may already have a built-in TPM chip. The programmer may do so because he may want to test certain TPM functions under certain circumstances without having to reboot the computer every time he makes a change, as he may have to with a built-in TPM chip. Using ETPM 1200 a programmer may be able to enter specific state information and configuration data into ETPM 1200. Then the programmer can use the entered data in ETPM 1200 to test how the program responds. In addition, a user may be able to store his personal security information on ETPM 1200 and use this information on host computer 1100. Thus, the user may use the information on ETPM 1200 in addition to the information on host computer 1100's TPM.

Host computer 1100 and ETPM 1200 may be connected either before or after host computer 1100 has been booted, depending on how ETPM 1200 is to be used. For example, if the programmer wants to load a specific state condition into ETPM 1200 and then test his program, he may not need to reboot host computer 1100 before testing his program using the specific state condition.

The timing of when ETPM 1200 is connected to host computer 1100 may affect where in a software stack of host computer 1100 ETPM 1200 may be installed. As host computer 1100 boots up it may load several different levels of software beginning at the BIOS level and progressing through to the application level (other intermediate levels may include the operating system loader level, the operating system level, and the Trusted Software Stack (TSS) level). The lower in the stack (closer to BIOS level) ETPM 1200 is installed the greater the security and trust between host computer 1100 and ETPM 1200. In some embodiments, this may affect the Core Root of Trust (CRT) and/or the level of security between host computer 1100 and ETPM 1200. In some embodiments, the decrease in the level of security may be mitigated by preloading ETPM 1200 with measurement values from the software levels below the level at which ETPM 1200 is installed. In some embodiments, the measurement values may then be verified. This may extend the CRT to include software methods residing on ETPM 1200. For example, if the programmer wants ETPM 1200 to be installed at the operating system level he may preload ETPM 1200 with measurement values for lower layers in the software stack such as the operating system loader and the BIOS.

When the connection between host computer 1100 and ETPM 1200 is established, ETPM 1200 may be cryptographically bound to host computer 1100. ETPM 1200 may initially be bound to host computer 1100 through preshared keys or using a cryptographic key exchange protocol. These keys may be used in subsequent connections with host computer 1100 (until ETPM 1200 is reset). In establishing the connection between host computer 1100 and ETPM 1200 some embodiments may use a shared secret key method that is distributed during configuration. This may be done as a way to bind host computer 1100 and ETPM 1200. Once ETPM 1200 has been connected, configured and authenticated, host computer 1100 may begin to run applications that use TPM functionality, and these applications may be able to trust the data used because of the ETPM 1200.

Host computer 1100 is depicted as having processor 1110, memory 1120 and interface 1130. Similarly ETPM 1200 is depicted as having processor 1210, memory 1220 and interface 1230. When running an application on host computer 1100, these components may work together, passing information between one another, to generate, receive and/or process TPM requests/responses from an external TPM device, such as ETPM 1200. This may enable a secure computing environment allowing the program to request TPM functionality, regardless of whether the host computer has a built-in TPM chip.

Processor 1110 controls the operation and administration of host computer 1100 by processing information and signals received from a user and/or one or more programs or applications running on host computer 1100. Processor 1210 controls the operation and administration of ETPM 1200 by processing information and signals received from host computer 1100 and/or a programmer via interface 1230. Processors 1110 and 1210 may include any suitable hardware, software, or both that operate to control and process signals. For example, processors 1110 and 1210 may be programmable logic devices, microcontrollers, microprocessors, any suitable processing devices or resources, or any combination of hardware, software and/or encoded logic. Processors 1110 and 1210 may be similar, or different, types of devices. For example, processor 1110 may be a microprocessor, and processor 1210 may be a microcontroller. In particular embodiments, processor 1110 may be used in combination with memory 1120 to run an application stored within memory 1120 that requires TPM functionality and to facilitate passing any TPM requests to ETPM 1200 via connection 1300. In some embodiments, processor 1210 may be used in combination with memory 1220 to process any received TPM requests and to generate a response to be sent back to host computer 1100 via connection 1300.

Memory 1120 and 1220 may be any form of volatile or non-volatile memory including, without limitation, magnetic media, optical media, random access memory (RAM), read-only memory (ROM), removable media, or any other suitable local or remote memory component. Memory 1120 may store any suitable information to implement features of various embodiments, such as programs that may require one or more TPM functions and/or any instructions that may be needed to carry out one or more of the TPM functions. Memory 1220 may store any suitable information to implement features of various embodiments, such as encryption/decryption keys, identities, passwords, digital certificates, and/or state information.

Connection 1300 may be a wireless or wireline connection between host computer 1100 and ETPM 1200. Connection 1300 allows host computer 1100 and ETPM 1200 to pass control and data between each other. For example, host computer 1100 may send a common TPM command to ETPM 1200 through connection 1300, and ETPM 1200 may send a response to host computer 1100 through connection 1300. More specifically, in a particular scenario the application being run on host computer 1100 may request a secure operation, such as requesting a key stored by ETPM 1200. The request for the key may be sent to ETPM 1220 via connection 1300, and in response ETPM 1200 may send the requested key back to host computer 1100 via connection 1300. Connection 1300 may couple host computer 1100 with ETPM 1200 via interfaces 1130 and 1230, respectively. Interfaces 1130 and 1230 represent any port or connection, real or virtual, including any suitable hardware and/or software that may allow host computer 1100 and ETPM 1200 to exchange information and/or signals with one another. For example, interfaces 1130 and 1230 (and connection 1300) may be universal serial bus (USB) interfaces, FireWire interfaces, Ethernet interfaces, peripheral component interconnect (PCI) interfaces, memory bus interfaces, serial interfaces, parallel interfaces, a Bluetooth connection, a radio frequency connection, or any other wired or wireless connection. In some embodiments connection 1300 may include some added security, such as encryption using shared keys. This may help to reduce and/or prevent tampering with connection 1300, the data passed there through, and/or ETPM 1200.

Modifications, additions, or omissions may be made to system 1000. For example, system 1000 may include any suitable number of host computers 1100 or ETPMs 1200. As another example, host computer 1100 may include any suitable number of additional components, such as an input port for receiving user input and an output port for facilitating a graphical user interface. Additionally, the operations and functionality of system 1100 may be performed using any suitable logic.

Figure 2:
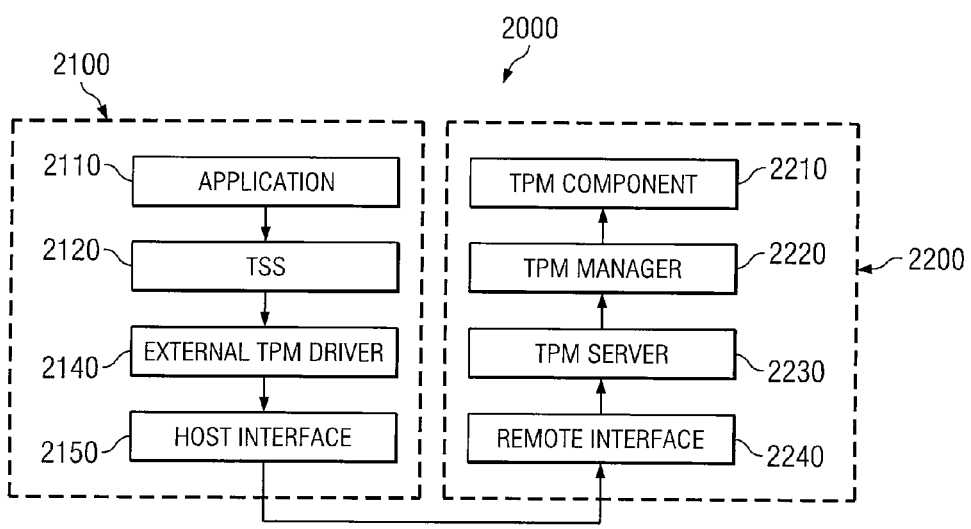
FIG. 2 is a detailed block diagram illustrating functional components of the system for implementing the external trusted platform module depicted in FIG. 1, in accordance with particular embodiments.

FIG. 2 is a detailed block diagram illustrating functional components of the system for implementing the external trusted platform module depicted in FIG. 1. Similar to the arrangement and coupling of host computer 1100 and ETPM 1200 in FIG. 1, Host computer 2100 is coupled to ETPM 2200. Furthermore, host computer 2100 and ETPM 2200 may have components similar to host computer 1100 and ETPM 2100, respectively.

Host computer 2100 may include its own housing and any components (e.g., a processor and memory) necessary to provide the functionality described herein. These components may provide the necessary resources for application 2110, Trusted Software Stack (TSS) 2120, external TPM driver 2140, and host interface 2150. These separate blocks, taken together, allow host computer 2100 to generate a request for a TPM function that is translated into a common TPM command and sent to ETPM 2200 without having to perform modifications to the internal components of host computer 2100.

ETPM 2200 may be external to host computer 2100 and may include its own housing and any components (e.g., a processor and memory) necessary to provide the functionality described herein. In particular embodiments, the housing may function to restrict or prohibit physical tampering with the internal components of ETPM 2200. The components of ETPM 2200 may provide the necessary resources for TPM component 2210, TPM manager 2220, and TPM server 2230. These separate blocks, taken together, allow ETPM 2200 to provide functionality similar to that provided by a built-in TPM chip.

Application 2110 may be any application that supports and/or uses TPM functionality, such as an encrypted data management program or a secure e-mail program. Application 2110 may be a finished program running on host computer 2100 in which host computer 2100 contains a built-in TPM chip or is connected to an external TPM device, such as ETPM 2200. In some embodiments, application 2110 may be a program that is under development. During development a programmer may desire to test TPM functionality of the program. More specifically, host computer 2100 may contain a built-in TPM chip, but the programmer may want to test a particular TPM function under certain state conditions. Because the state of a built-in TPM chip may not be readily modified, the programmer may set the state of ETPM 2200 and direct host computer 2100 to send TPM requests to ETPM 2200. Thus, ETPM 2200 will have the desired state so that the programmer can test how the program operates when using the particular TPM function under the desired state conditions.

Typically, one of the features of application 2110 is to protect the security of data. For example, application 2110 may be a file management program for storing, retrieving and editing encrypted data. The file management program may request a key used to decrypt a file from a TPM as a way to help identify that the user is in fact an authorized user. Because of the wide variety of applications that may use TPM functions, the components of secure system 2000 will be described in the context of a file management application such as the one described above.

In some embodiments application 2110 may communicate with TSS 2120. For example, a user may use application 2110 to open an encrypted file stored in memory within host computer 2100. Application 2110 may recognize that the requested file is encrypted and that to decrypt the file it will need a key that may be stored in a TPM. TSS 2120 may access the TPM functionality through driver modules (e.g., external TPM driver 2140) that provide a standardized method for TSS 2120 to access TPM functionality and take advantage of its capabilities. TSS 2120 may provide application 2110 with access to TPM functionality through an application program interface (API). More specifically, application 2110 may use the API provided by TSS 2120 to send TSS 2120 the information needed to invoke the appropriate TPM function to retrieve the key.

From the perspective of application 2110, it does not matter whether a built-in TPM or ETPM 2200 is used. More specifically, whenever application 2110 needs TPM functionality the request is sent to TSS 2120 and TSS 2120 returns an appropriate response. This interaction between application 2110 and TSS 2120 is similar to the interaction that occurs when the TPM functionality is performed by a built-in TPM chip.

TSS 2120 may be functionally located between application 2110 and external TPM driver 2140 (ETPM driver 2140). TSS 2120 may translate secure operation (TPM function) requests from application 2110 into TPM commands and pass these commands to ETPM driver 2140. TSS 2120 may use various components of host computer 2100, such as a processor and memory, to convert the particular TPM functions sent by application 2110 into TPM commands. Thus, when TSS 2120 receives the TPM function request from application 2110 for the key to decrypt the requested file, it may be able to generate the appropriate TPM command and send it to ETPM driver 2140.

ETPM driver 2140 may be in communication with TSS 2120 and host interface 2150. ETPM driver 2140 may receive the common TPM commands from TSS 2120. In some embodiments in which host computer 2100 includes a built-in TPM chip, ETPM driver 2140 may be used to determine where the common TPM command is to be sent (e.g., along a path towards the built-in TPM or along the path towards ETPM 2200). Like TSS 2120, ETPM driver 2140 may use various components of host computer 2100, such as a processor and memory, to properly process the TPM commands before passing them to an internal TPM chip or host interface 2150.

ETPM driver 2140 may also be involved in establishing the connection with ETPM 2200 through the exchange of information between ETPM 2200 and host computer 2100. In particular embodiments, ETPM driver 2140 may receive notification of an attempted connection with ETPM 2200. Establishing the connection may include an initialization step in which ETPM 2200 is cryptographically bound to host computer 2100. This may be achieved through the exchange of keys and mutual authentication resulting in the association of ETPM 2200 with ETPM driver 2140. In some embodiments, while establishing the connection configuration information may pass between ETPM 2200 and ETPM driver 2140. This configuration information may be used in the operation of ETPM 2200. For example, the configuration information may include such information as operating modes, (e.g., testing, secure) and any encryption parameters (e.g., key exchange, authentication information) that may be used with the connection.

Interfaces 2150 and 2240 may be similar to interfaces 1130 and 1230 of host computer 1100 and ETPM 1200, respectively, of FIG. 1. Host interface 2150 and remote interface 2240 may allow host computer 2100 and ETPM 2200 to exchange any needed information to establish a connection (e.g., link type, link parameters, link status) and/or implement ETPM functionality. More specifically, interfaces 2150 and 2240 may represent any port or connection, real or virtual, including any suitable hardware and/or software that may allow host computer 2100 and ETPM 2200 to exchange information and signals with one another. For example, interfaces 2150 and 2240 may be universal serial bus (USB) interfaces, FireWire interfaces, Ethernet interfaces, peripheral component interconnect (PCI) interfaces, memory bus interfaces, serial interfaces, parallel interfaces, a Bluetooth interface, a radio frequency interface, or any other wired or wireless interface. In some embodiments there may be added security, such as encryption using shared keys. This may help to reduce and/or prevent tampering with the communications sent between host computer 2100 and ETPM 2200.

TPM server 2230 may be able to communicate with remote interface 2240 thus providing TPM server 2230 with the common TPM commands from external TPM driver 2140. TPM server 2230 may format the common TPM commands into the proper format for TPM component 2210. Because ETPM 2200 receives TPM commands and formats them internally, there may be a reduced likelihood of incompatibility issues between host computer 2100 and ETPM 2200. TPM server 2230 may use any of the components of ETPM 2200 (e.g., a processor or memory) to format the TPM commands. Once formatted the TPM commands may be sent directly to TPM component 2210, or they may pass through TPM manager 2220 on their way to TPM component 2210.

In some embodiments TPM component 2210 may include a TPM chip, similar to a built-in TPM chip. In particular embodiments TPM component 2210 may include a TPM emulator. The TPM emulator may be implemented in hardware, software, or a combination of both hardware and software. For example, TPM component 2210 may be implemented in separate hardware reserved solely for emulating a TPM, or it may be implemented using the various components of ETPM 2200 that are used for other functions (e.g., the same processor or memory used by TPM manager 2220 and TPM server 2230) or it may be implemented using some combination of the above. Upon receiving the request from application 2110 via TPM server 2230, in a format it understands, TPM component 2210, may then process the request for the key and subsequently load or generate the requested key which may then be sent back to application 2110 following a similar path, though in reverse order.

As mentioned above, in some embodiments TPM server 2230 may send the formatted commands directly to TPM component 2210. In particular embodiments TPM component 2210 may receive the commands from TPM manager 2220. TPM manager 2220 may also be used to control the access, configuration and/or other internal aspects of TPM component 2210. In some embodiments, ETPM 2200 may include a management port that may allow a programmer access to various internal aspects of TPM component 2210. This may be particularly useful in situations in which ETPM 2200 is being used in connection with the development of application 2110 because it may allow the developer to have more direct control over the ETPM and its states, than he would have over a TPM chip integrated into host computer 2100.

It may be recognized that system 2000 is merely an example configuration of a system in which an external TPM (ETPM 2200) is coupled with a host computer (host computer 2100), in accordance with particular embodiments. Other systems may include different components that may be arranged differently to accomplish the functionality and features described herein. For example, external TPM driver 2140 is coupled to host interface 2150, in some embodiments, external TPM driver 2140 may also include a physical TPM driver that communicates with a built-in TPM chip located within host computer 2100.

Some of the technical advantages of particular embodiments include providing software and/or system developers with TPM functionality in a readily accessible ETPM device. Accordingly, developers and/or programmers are provided with a development tool that is simpler and more efficient to use than traditional built-in TPM chips. Another technical advantage of particular embodiments includes providing older devices that do not contain a built-in TPM chip with TPM functionality.

Accordingly, older devices may be able to access TPM functionality and/or interact within a trusted computing environment without having to make internal changes to the computing device. Yet another technical advantage of particular embodiments includes allowing a user to store certain personal security information on the ETPM and use this in a limited number of different hosts and still realize increased security and the ability to run secure applications.

Figure 3:
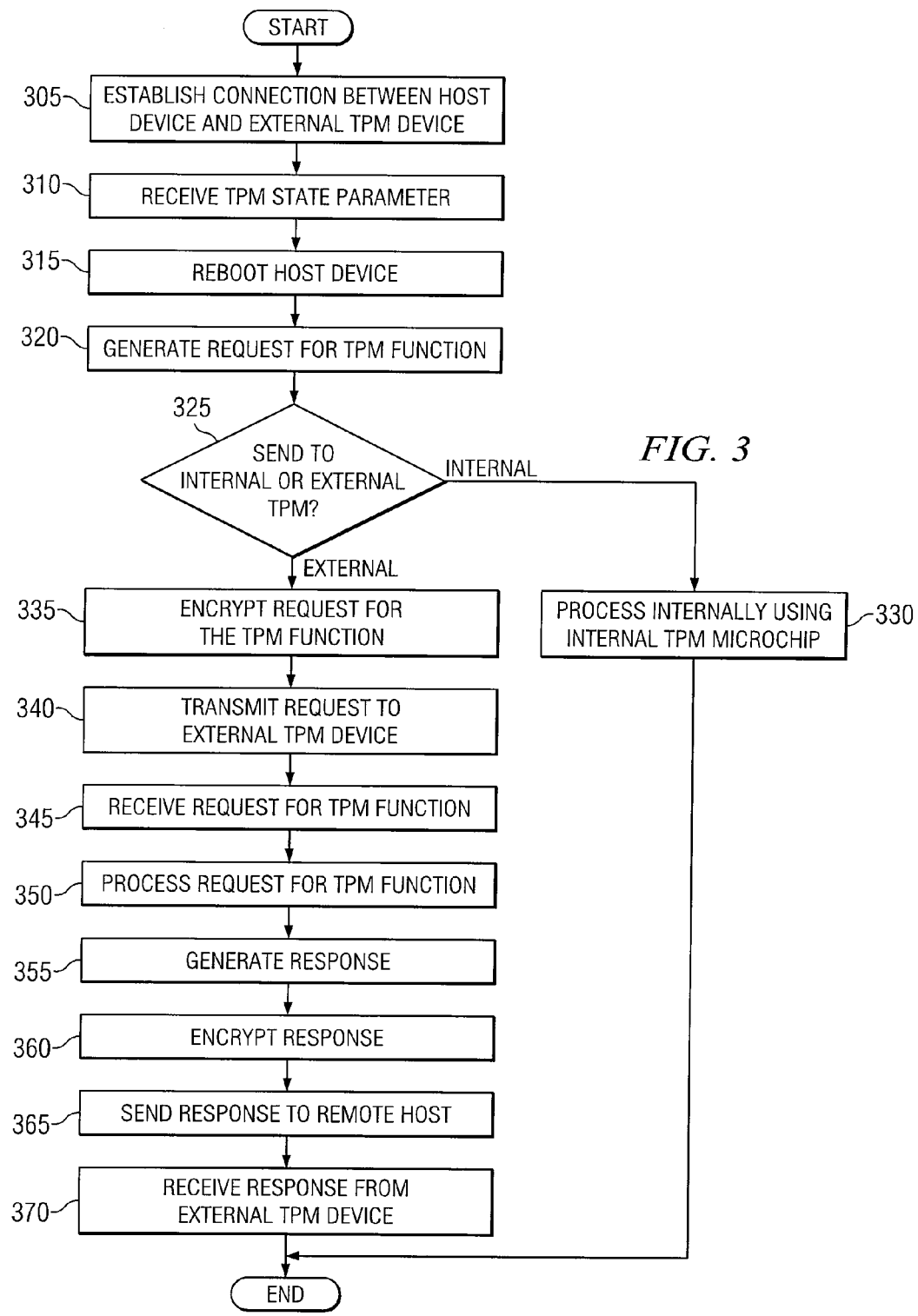
FIG. 3 is a flowchart illustrating a method for implementing an external trusted platform module, in accordance with particular embodiments.

FIG. 3 is a flowchart illustrating a method for implementing an external trusted platform module, in accordance with particular embodiments. For purposes of this method it may be assumed that the host device is a personal computer being used by a developer to develop a database application program that takes advantage of TPM functionality. It may further be assumed that the host device has an internal TPM microchip that is accessed through the PCI bus. It may be further assumed that the host computer has the ETPM driver software installed as part of the BIOS and may be invoked early in the boot process. Additionally, it may be assumed that there is a user who is the owner of the ETPM and has an account on the host device.

The method begins at step 305 where a connection is established between the host device and an external TPM device (ETPM). The connection establishment may include the notification of the attempted connection of the ETPM to the ETPM driver and association of the ETPM with the ETPM driver. In establishing the connection, configuration information may pass between the two devices. The configuration information may be used to establish communication (e.g., link type, link parameters), operating modes, (e.g., testing, secure) and any encryption parameters (e.g., key exchange, authentication information) used for the connection. This may cryptographically bind the ETPM to the host device. Further details of one example of this step are provided in FIG. 4. Both the host device and the ETPM may be contained within their own separate enclosures. This may allow the ETPM to temporarily connect to the host device and to be moved separately from the host device. The connection between the host device and the ETPM may be any of the wired or wireless connections discussed above with respect to FIGS. 1 and 2. The way in which the host device and the ETPM establish the connection may vary depending on the type of connection (e.g., a USB connection may involve different signaling/handshaking than a Bluetooth connection).

At step 310 the ETPM receives a TPM state parameter. The TPM state parameter may be received from an external source for use in setting the state of the ETPM for testing purposes. For example, the state parameter may be sent by the developer to test how the database program will respond to the state parameter he sent. This may allow the developer to test specific TPM state parameters without having to alter his built-in TPM chip. The state parameter may be sent to the ETPM via the connection with the host device, or through a different device connected to the ETPM. In some embodiments, the ETPM may include its own input device or module which the developer may use to enter the TPM state parameter. In some embodiments or scenarios, the ETPM may not receive the TPM parameter at step 310. For example, if the user is not testing how the program responds to a particular state then the ETPM may not receive the TPM state parameter.

At step 315 the host device is rebooted. This may be done to increase the level of trust between the host device and the ETPM by allowing the ETPM to be installed lower in the stack. For example, the ETPM may become associated with an ETPM driver that is placed lower in the software stack. Recall that the lower in the stack (closer to BIOS level) the ETPM is installed the greater the security and trust between the host device and the ETPM. In other situations the developer may not need to reboot the host device in order for the security and trust between the host device and the ETPM to be at a sufficiently high level. More specifically, in some scenarios the level of trust between the host device and the ETPM may be sufficient enough to allow the ETPM to respond to the host device's TPM request using the received TPM state parameter.

At step 320 the host device generates a request for a TPM function. The request may be for the internal TPM chip within the host device or it may be for the ETPM. In order for the host device to know where to send the request, at step 325 it determines whether the request is for the internal TPM or the ETPM. If it is determined that the request is for the internal TPM then, at step 330, the request is processed internally using the internal TPM microchip according to the standard procedures set forth by the Trusted Computing Group. In some embodiments, the determination of where to send the request may be made by an ETPM driver (e.g., ETPM driver 2140). The ETPM driver may implement a switch that, depending on policy, may determine whether the request is sent to the internal TPM, ETPM or both. The policy may specify where each request type needs to be sent. For example, a simple policy may be "If ETPM is present, send everything to ETPM." In some embodiments, certain information may be sent to only one of the internal TPM or ETPM.

If the request is for the ETPM, for example if the request was generated by the database program which the developer is working on, then the host device may encrypt the request for the TPM function at step 335. The request may be encrypted at step 335 to increase the security of the connection (e.g., prevent tampering with the request). The encryption may not affect the level of trust between the host device and the ETPM. In some instances the request may not be encrypted.

At step 340 the host device transmits the request to the ETPM, and at step 345 the ETPM receives the request. The request may be transmitted between the host device and the ETPM in accordance with whatever protocol is used by the connection established at step 305 (e.g., a WiFi connection may use different protocols than a serial connection to communicate data, such as the request, between the two devices).

At steps 350 and 355 the ETPM processes the request for the TPM function and generates a response. Depending on the internal configuration of the ETPM this may involve the use of a TPM microchip within the ETPM, a TPM emulator comprising software, hardware or a combination of hardware and software. Depending on the request, the response may be a signature, a key, a random number or any other piece of data or information that may be stored or generated by a TPM.

At step 360 the ETPM encrypts the response before sending it back to the host device. Depending on the situation, the encryption technique used by the ETPM may be similar to or different than the encryption technique used by the host device.

At step 365 the ETPM sends the response to the host device and at step 370 the host device receives the response. Once the host device receives the response it may pass it to the database program to allow the database program to finish whatever task it had started that caused it to request the TPM functionality.

Figure 4:
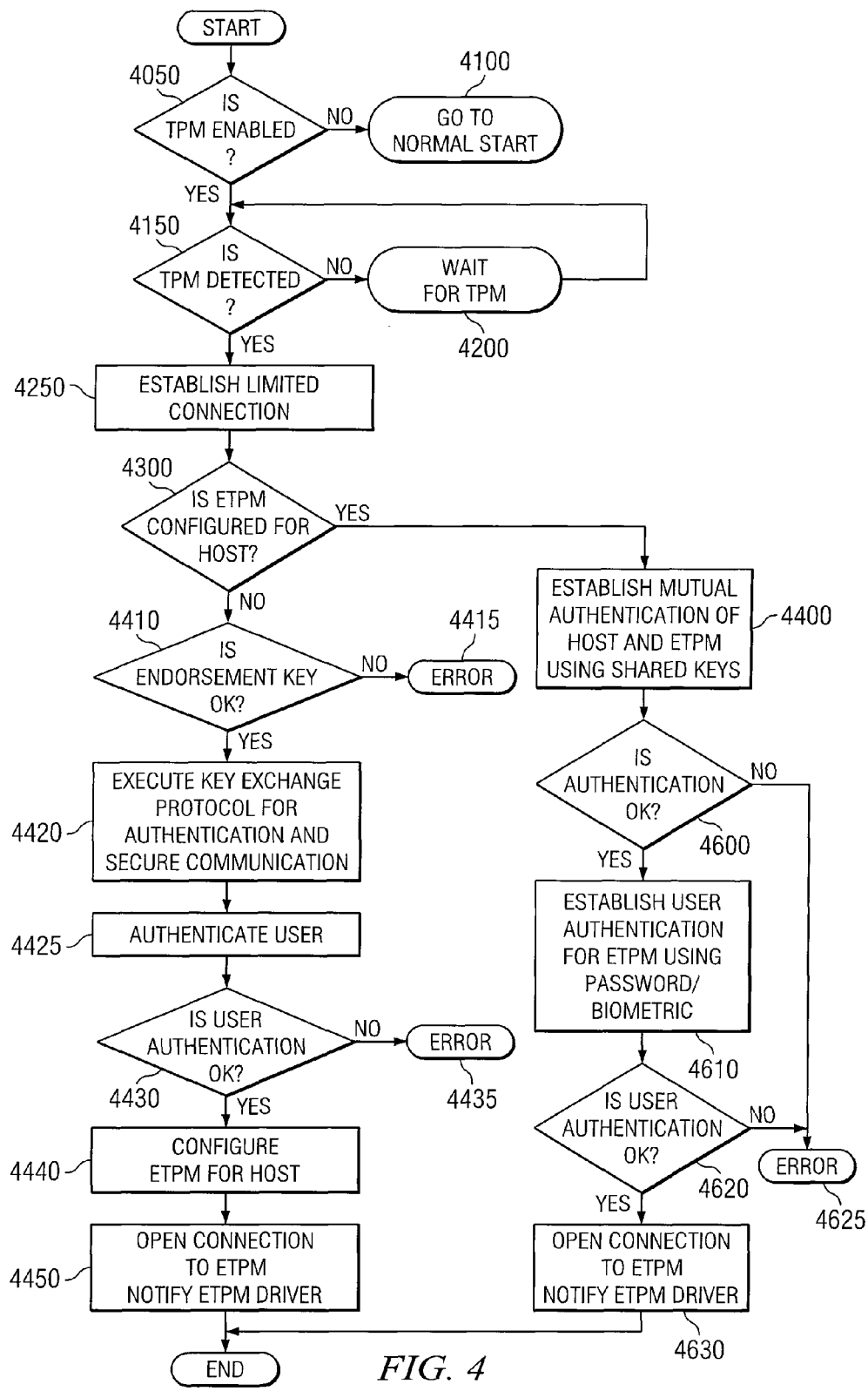
FIG. 4 is a flowchart illustrating a method for implementing the step of establishing the connection between the host device and the external TPM device, in accordance with particular embodiments.

FIG. 4 is a flowchart illustrating a method for implementing the step of establishing the connection between the host device and the external TPM device, in accordance with particular embodiments. This may be only one example of how a connection between a host device and an ETPM may be established. For purposes of this flowchart assume that the method begins during boot up of the host device or when the ETPM attempts to connect to the host device. At step 4050, the host device checks its internal tables to determine if it is configured to accept an ETPM. If it is not, in step 4100 the ETPM is ignored and the host device returns to a normal bootup procedure, or flags an improper device connection. If the host has been configured to accept an ETPM then, at step 4150, a determination is made as to whether the ETPM is detected as being present. If it is not detected then, at step 4200, the host device may wait for the ETPM to be detected. Depending on the embodiment, the host device may wait for a limited amount of time and if the ETPM is not detected, then an error condition may arise (e.g., stop or flag message may be generated). If the ETPM has been detected then, at step 4250, the ETPM driver on the host device establishes a limited connectivity connection with the ETPM. The limited connection may only allow specific responses from the ETPM to be received. In step 4300, the host device may request that the ETPM provide evidence (e.g., by providing a previously shared secret key) that the ETPM has been configured for this host. If the host device validates the ETPM, then at step 4400, a more complete mutual authentication may be performed. In some embodiments, this may be accomplished by using the previously known shared keys established during the initial configuration. For example, the host device and the ETPM may use a simple authentication scheme to exchange nonces encrypted with the shared keys or public-private key pairs. If authentication is successful at step 4600, then the user authentication procedure of step 4610 may be invoked to verify that the user is known to the ETPM. This may be accomplished by any of a variety of methods such as password, passphrase or biometrics. If user authentication fails at step 4620, then the process may be stopped and an error is flagged in step 4625. If the authentication succeeds then at step 4630, the connection to the ETPM may be opened for full communication and the ETPM driver is notified of a successful initialization.

If, in step 4300, the ETPM is found not to be configured for the host, then at step 4410, the host device requests the ETPM's endorsement key (Ekey) to verify the validity of the ETPM. For example, the validity may be checked by the host device trying a limited number of well known public decryption keys from ETPM vendors. If the Ekey is not valid then, at step 4415, the system stops or reports an error. If the ETPM is determined to be valid then, at step 4420, a key exchange method may be executed to securely provide encryption and authentication keys to the host and the ETPM. These keys may be preshared through an independent process or a key exchange protocol such as Resurrecting Ducklings. The keys may be shared secrets or public-private pairs and may be used for both authentication and privacy/encryption. Following the key exchange, the user authentication step 4425 is performed to verify that the user is known to the TPM. If the user authentication in step 4430 fails, then an error may be reported and the process is stopped at step 4435. If the user is verified, then a configuration step 4440 is performed that includes setting permissions, connection information, storing keys and host information, as well as modes. Modes may include the special testing mode in which the user may set values internally to the ETPM. Following the configuration, in step 4450 the connection to the ETPM is opened and the ETPM driver is notified.

The above procedures have been described for a single host machine. It is possible to partition the ETPM so that the ETPM maintains separate memory space for a limited number of host devices. This may permit a user to employ the ETPM in several devices by maintaining separate memory spaces for these devices. The mutual authentication step for the ETPM may need to identify the machine and then execute its procedures from the appropriate memory space.

Modifications, additions, or omissions may be made to the method without departing from the scope of the invention. The method may include more, fewer, or other steps. Additionally, steps may be performed in any suitable order without departing from the scope of the invention.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for implementing an external trusted platform module, comprising:
    establishing a connection with a remote host device via a remote interface;
    receiving a state message specifying a trusted platform module (TPM) state parameter to be used by an external TPM;
    receiving a request for a TPM function from the remote host device via the remote interface;
    processing the request for the TPM function received from the remote host device using the received TPM state parameter;
    generating a response to the request for the TPM function based on the processing of the request for the TPM function received from the remote host device; and
    sending the response to the request for the TPM function to the remote host device via the remote interface.

2. The method of claim 1, further comprising receiving at least one TPM state parameter to be used when processing the request for the TPM function received from the host device via the remote interface.

3. The method of claim 1, wherein processing the request for the TPM function received from the host device via the remote interface comprises processing the request for the TPM function received from the host device via the remote interface with a component selected from the group consisting of a software based TPM emulator, a hardware based TPM emulator, a hardware and software based TPM emulator, and a TPM microchip.

4. The method of claim 1, wherein establishing a connection with a remote host device via a remote interface comprises establishing a connection with a remote host device via a remote interface that cryptographically binds the external platform module and the host device.

5. The method of claim 1:
    wherein the request for the TPM function received from the host device is encrypted; and
    further comprising encrypting the response to the request for the TPM function before sending the response to the request for the TPM function to the host device via the interface.

6. The method of claim 1, further comprising:
    receiving a measurement value generated by an internal TPM within the remote host device; and
    extending the core root of trust of the external TPM based on the measurement value.

7. The method of claim 1, wherein the TPM state parameter is based on a simulation state of the remote host device used to test the TPM function in the simulation state.

8. The method of claim 1, wherein receiving a state message specifying a trusted platform module (TPM) state parameter to be used by an external TPM comprises receiving a state message from a device separate from the remote host device, the state message specifying a trusted platform module (TPM) state parameter to be used by an external TPM.

9. A method for implementing an external trusted platform module, comprising:
    establishing a connection with an external trusted platform module (TPM) device via a remote interface;
    transmitting a state message specifying a TPM state parameter to be used by the external TPM to process a request for a TPM function;
    generating the request for the TPM function;
    transmitting the request for the TPM function to the external TPM device via the remote interface; and
    receiving a response to the request for the TPM function from the external TPM device via the remote interface.

10. The method of claim 9, further comprising rebooting after establishing the connection with the external TPM device via the remote interface.

11. The method of claim 9, wherein the external TPM device comprises a component selected from the group consisting of a software based TPM emulator, a hardware based TPM emulator, a hardware and software based TPM emulator, and a TPM microchip.

12. The method of claim 9:
    further comprising encrypting the request for the TPM function before sending the request for the TPM function to the external TPM device via the remote interface; and
    wherein the response to the request for the TPM function from the external TPM device is encrypted.

13. The method of claim 9, further comprising determining whether to route the request for the TPM function to an internal TPM microchip or to transmit the request for the TPM function to the external TPM device via the remote interface.

14. A system for implementing an external trusted platform module, comprising:
    an interface configured to:
        establish a connection with a remote host device via a remote interface; and
        receive a state message specifying a trusted platform module (TPM) state parameter to be used by an external TPM;
        receive a request for a TPM function from the remote host device via the remote interface; and
    a processor coupled to the interface and configured to:
        process the request for the TPM function received from the remote host device using the received TPM state parameter;
        generate a response to the request for the TPM function based on the processing of the request for the TPM function received from the remote host device; and
        send the response to the request for the TPM function to the remote host device via the remote interface.

15. The system of claim 14, wherein the interface is further configured to receive at least one TPM state parameter to be used when processing the request for the TPM function received from the host device via the remote interface.

16. The system of claim 14, wherein the processor configured to process the request for the TPM function received from the host device via the remote interface comprises a processor configured to process the request for the TPM function received from the host device via the remote interface with a component selected from the group consisting of a software based TPM emulator, a hardware based TPM emulator, a hardware and software based TPM emulator, and a TPM microchip.

17. The system of claim 14, wherein the interface to configured to establish a connection with a remote host device via a remote interface comprises an interface configured to establish a connection with a remote host device via a remote interface that cryptographically binds the external platform module and the host device.

18. The system of claim 14 wherein:
the request for the TPM function received from the host device is encrypted; and
the processor is further configured to encrypt the response to the request for the TPM function before sending the response to the request for the TPM function to the host device via the interface.

19. A system for implementing an external trusted platform module, comprising:
an interface configured to establish a connection with an external trusted platform module (TPM) device via a remote interface; and
a processor coupled to the interface and configured to generate a request for a TPM function; and
the interface further configured to:
transmit a state message specifying a TPM state parameter to be used by the external TPM to process the request for the TPM function;
transmit the request for the TPM function to the external TPM device via the remote interface; and
receive a response to the request for the TPM function from the external TPM device via the remote interface.

20. The system of claim 19, wherein the processor is further configured to reboot after establishing the connection with the external TPM device via the remote interface.

21. The system of claim 19, wherein the external TPM device comprises a component selected from the group consisting of a software based TPM emulator, a hardware based TPM emulator, a hardware and software based TPM emulator, and a TPM microchip.

22. The system of claim 19:
wherein the processor is further configured to encrypt the request for the TPM function before sending the request for the TPM function to the external TPM device via the remote interface; and
wherein the response to the request for the TPM function from the external TPM device is encrypted.

23. The system of claim 19, wherein the processor is further configured to determine whether to route the request for the TPM function to an internal TPM microchip or to transmit the request for the TPM function to the external TPM device via the remote interface.

24. Logic embodied in a non-transitory computer readable medium, the computer readable medium comprising code configured to:
establish a connection with a remote host device via a remote interface;
receive a state message specifying a trusted platform module (TPM) state parameter to be used by an external TPM;
receive a request for a TPM function from the remote host device via the remote interface;
process the request for the TPM function received from the remote host device using the received TPM state parameter;
generate a response to the request for the TPM function based on the processing of the request for the TPM function received from the remote host device; and
send the response to the request for the TPM function to the remote host device via the remote interface.

25. The medium of claim 24, wherein the code is further configured to receive at least one TPM state parameter to be used when processing the request for the TPM function received from the host device via the remote interface.

26. The medium of claim 24, wherein the code configured to process the request for the TPM function received from the host device via the remote interface comprises code configured to process the request for the TPM function received from the host device via the remote interface with a component selected from the group consisting of a software based TPM emulator, a hardware based TPM emulator, a hardware and software based TPM emulator, and a TPM microchip.

27. The medium of claim 24, wherein the code configured to establish a connection with a remote host device via a remote interface comprises code configured to establish a connection with a remote host device via a remote interface that cryptographically binds the external platform module and the host device.

28. The medium of claim 24 wherein:
the request for the TPM function received from the host device is encrypted; and
the code is further configured to further comprising encrypting the response to the request for the TPM function before sending the response to the request for the TPM function to the host device via the interface.

29. Logic embodied in a non-transitory computer readable medium, the computer readable medium comprising code configured to:
establish a connection with an external trusted platform module (TPM) device via a remote interface;
transmit a state message specifying a TPM state parameter to be used by the external TPM to process a request for a TPM function;
generate the request for the TPM function;
transmit the request for the TPM function to the external TPM device via the remote interface; and
receive a response to the request for the TPM function from the external TPM device via the remote interface.

30. The medium of claim 29, wherein the code is further configured to reboot after establishing the connection with the external TPM device via the remote interface.

31. The medium of claim 29, wherein the external TPM device comprises a component selected from the group consisting of a software based TPM emulator, a hardware based TPM emulator, a hardware and software based TPM emulator, and a TPM microchip.

32. The medium of claim 29:
wherein the code is further configured to encrypt the request for the TPM function before sending the request for the TPM function to the external TPM device via the remote interface; and
wherein the response to the request for the TPM function from the external TPM device is encrypted.

33. The medium of claim 29, wherein the code is further configured to determine whether to route the request for the TPM function to an internal TPM microchip or to transmit the request for the TPM function to the external TPM device via the remote interface.

34. A system for implementing an external trusted platform module, comprising:
- means for establishing a connection with a remote host device via a remote interface;
- means for receiving a state message specifying a trusted platform module (TPM) state parameter to be used by an external TPM;
- means for receiving a request for a TPM function from the remote host device via the remote interface;
- means for processing the request for the TPM function received from the remote host device using the received TPM state parameter;
- means for generating a response to the request for the TPM function based on the processing of the request for the TPM function received from the remote host device; and
- means for sending the response to the request for the TPM function to the remote host device via the remote interface.

35. A system for implementing an external trusted platform module, comprising:
- means for establishing a connection with an external trusted platform module (TPM) device via a remote interface;
- means for transmitting a state message specifying a TPM state parameter to be used by the external TPM to process a request for a TPM function;
- means for generating the request for the TPM function;
- means for transmitting the request for the TPM function to the external TPM device via the remote interface; and
- means for receiving a response to the request for the TPM function from the external TPM device via the remote interface.

* * * * *

UNITED STATES PATENT AND TRADEMARK OFFICE
CERTIFICATE OF CORRECTION

| | | |
|---|---|---|
| PATENT NO. | : 8,272,002 B2 | |
| APPLICATION NO. | : 11/840810 | |
| DATED | : September 18, 2012 | |
| INVENTOR(S) | : Jesus Molina et al. | |

It is certified that error appears in the above-identified patent and that said Letters Patent is hereby corrected as shown below:

In the Claims

Col. 15, Ln. 7: After "interface" and before "configured" delete "to".

Signed and Sealed this
Thirtieth Day of September, 2014

Michelle K. Lee
*Deputy Director of the United States Patent and Trademark Office*